March 20, 1962 L. C. RUBENS ETAL 3,026,272
PROCESS FOR MAKING LATENT-FOAMING THERMOPLASTIC
POLYMER COMPOSITIONS
Original Filed Nov. 29, 1957
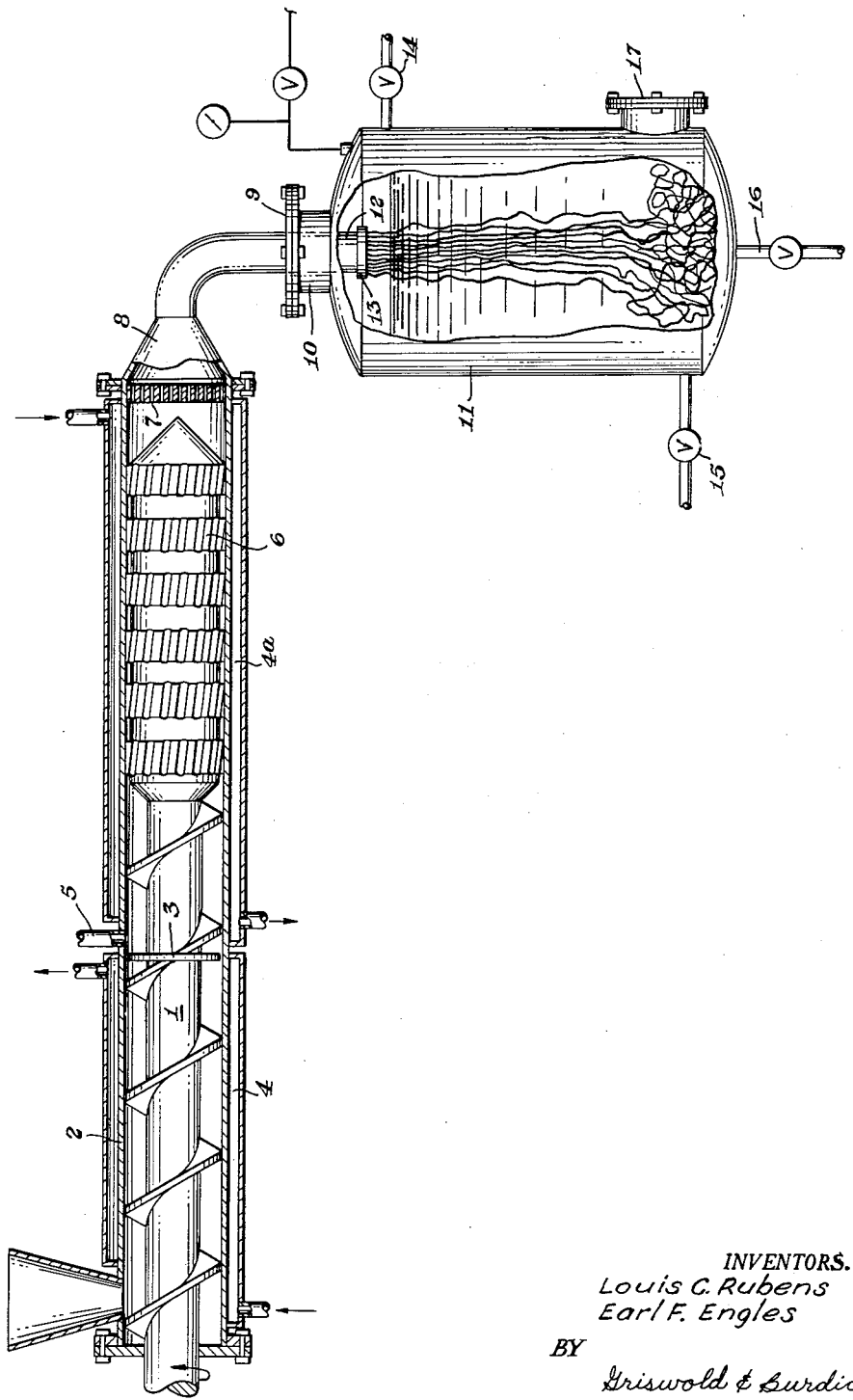
INVENTORS.
Louis C. Rubens
Earl F. Engles
BY
Griswold & Burdick
ATTORNEYS

United States Patent Office 3,026,272
Patented Mar. 20, 1962

3,026,272
PROCESS FOR MAKING LATENT-FOAMING THERMOPLASTIC POLYMER COMPOSITIONS
Louis C. Rubens and Earl F. Engles, Midland, Mich., assignors to The Dow Chemical Company, Midland, Mich., a corporation of Delaware
Continuation of application Ser. No. 699,667, Nov. 29, 1957. This application May 8, 1961, Ser. No. 110,606
11 Claims. (Cl. 260—2.5)

This invention concerns a process for making latent-foaming thermoplastic polymer compositions consisting essentially of a normally solid thermoplastic polymer having a volatile organic compound in which the polymer is substantially insoluble uniformly dispersed throughout, which composition is suitable for making cellular bodies upon heating the same to its softening temperature or above.

It is common practice to make cellular or foamed plastic masses by incorporating with a polymeric material a volatile organic liquid or a substance which decomposes under the action of heat to form a gas, and thereafter to heat the polymeric material, whereby the gas or vapors of the volatile liquid expand the polymer to form a cellular or porous mass.

U.S. Patent No. 2,681,321 makes porous plastic masses by incorporating with a thermoplastic polymer a volatile organic liquid in which the polymer is insoluble such as petroleum ether, pentane, heptane and the like either by swelling the solid polymer in the volatile organic liquid or by dissolving the volatile liquid in the monomer or a mixture of the monomer and polymer and heating the mixture at a temperature below the boiling point of the volatile liquid under the conditions employed to obtain a solid body containing the liquid dispersed throughout, and thereafter heating the solid body to a temperature above the boiling point of the liquid and above the softening point of the polymer, whereby a porous polymer mass is obtained.

The methods heretofore proposed for making normally solid thermoplastic polymer compositions suitable for use in the manufacture of porous plastic masses have not been entirely satisfactory since soaking of the solid polymer in a volatile organic liquid in which the polymer swells, but is substantially insoluble requires a prolonged period of time to obtain a product having the volatile liquid uniformly dispersed throughout. The polymerizing of the monomers in admixture with many volatile organic liquids in which the polymer is insoluble or only swellable lowers the rate of polymerization and increases the difficulties of manufacture.

It is a primary object of the invention to provide a process for readily, rapidly and economically incorporating a volatile organic compound with a normally solid thermoplastic polymer to form a latent-foaming polymeric composition, i.e. a polymeric composition consisting essentially of a normally solid thermoplastic polymer having a volatile organic compound, in which the polymer is substantially insoluble, uniformly dispersed throughout, which composition expands or foams to yield a cellular mass upon heating to its softening temperature or above. Another object is to provide a continuous process for making latent-foaming thermoplastic polymer compositions. A further object is to provide a process for making latent-foaming polymer compositions from normally solid thermoplastic vinyl aromatic polymers and volatile organic compounds in which the polymers are insoluble or only swellable. Other and related objects may appear from the following description of the invention.

According to the invention the foregoing and related objects can be obtained by feeding a heat-plastified normally solid thermoplastic polymer and a volatile organic compound in which the polymer is insoluble or only swellable into admixture with one another under pressure, agitating or malaxating the resulting mixture under pressure and at temperatures at which it remains flowable to obtain a uniform composition, then extruding the composition into a zone of greater than atmospheric pressure sufficient to prevent appreciable swelling of the extruded material and rapidly cooling the extruded material to a temperature at which it becomes rigid to obtain a solid body consisting essentially of the thermoplastic polymer containing the volatile organic compound uniformly dispersed throughout.

The process is described more particularly with reference to the accompanying drawing wherein there is shown partly in section the principal major elements of one of the various forms of apparatus which may be used in practicing the invention. The drawing shows a longitudinal section through the barrel of a plastics extruder having a first heating and pressing section, a second mixing and cooling section and an extrusion die or orifice discharging into a zone of greater than atmospheric pressure maintained in a pressure resistant receiving vessel above the surface of a liquid cooling medium.

In the drawing, the numeral 1 designates a feed screw of the compression type in the cylindrical barrel 2 of a horizontal plastics extruder. The screw 1 has a perforated sealing plate or ring 3 on a mid-section of the screw, suitably at from one-third to three-fourths of the distance from the feed hopper to the end of the screw. Such sealing plate or annular ring is usually an integral part of the screw 1. The sealing plate or ring 3 is suitably an annular ring or enlargement of the screw 1 and a diameter enough smaller than the bore of the barrel 2 to leave a clearance of from 0.125 to 0.25 inch between the two members, or it may consist of a perforated plate secured to the screw 1 and containing a number of drill holes of from 0.125 to 0.375 inch diameter, in which case a running clearance of from 0.010 to 0.020 inch between the bore of the barrel 2 and the rim of the sealing plate 3 is satisfactory. The barrel 2 is surrounded by chambers 4 and 4a for heating or cooling as required, such heating or cooling being carried out by passage of a heat transfer medium such as steam, air, oil or brine through the chambers 4 and 4a via suitable inlets and outlets. Beyond sealing plate 3 on the screw 1 is an inlet 5 into the barrel of the mixing and cooling section of the extruder. The screw 1 is provided with a terminal mixing torpedo 6, suitably of a type similar to that described in U.S. Patent No. 2,453,088. Beyond mixing torpedo 6 in the extrusion path is a screen or strainer 7 held in place across the discharge end of the barrel 2 by head 8 which is secured to the body of the extruder, e.g. by bolts. Head 8 may be of any desired form and may be straight or of the goose-neck or curved shape as shown. The head 8 is fitted with a flange 9 which is secured to flanged inlet 10 on a pressure-resistant receiving vessel 11 and provides a continuation of the extrusion path via conduit 12 which terminates in extrusion orifice or orifices 13. Any desired type of extrusion orifice or orifices can be used. The pressure resistant receiving vessel 11 is provided with valved inlets or outlets 14, 15 and 16 for feed and withdrawal of cooling liquid, e.g. water or brine, into and from the vessel, and with a flanged outlet 17 for removing the solid material, and an inlet 18 provided with a pressure gauge 19. A gas such as nitrogen or air is fed to the vessel 11 via the inlet 18 to provide a superatmospheric pressure within said vessel, e.g. a pressure of 50 pounds per square inch gauge pressure or above. The pressure-resistant receiving vessel 11 can be of any desired shape. The screw 1 of the plastics extruder is driven by any usual means such as an electric motor and variable speed drive (not shown).

A specific feature of the invention is the uniform blending or malaxating of the heat-plastified thermoplastic polymer and the volatile organic compound under pressure in the mixing and cooling section of the extruder which rapidly blends the ingredients uniformly with one another to form a homogeneously heat-plastified mass.

In producing a latent-foaming polystyrene composition by the method of the invention, granular polystyrene, suitably having a molecular weight corresponding to a viscosity characteristic of from 15 to 30 centipoises or higher as determined for a 10 weight percent solution of the polystyrene in toluene at 25° C., is fed into the hopper of the extruder and into the first heating and pressing section thereof, wherein the polystyrene is heat-plastified or melted and brought to a plastic flowable condition at temperatures between 160° and 280° C. The heat-plastified polystyrene is pressed by means of the flights of the screw 1 in barrel 2 of the extruder and forced through or around the sealing plate 3 into the second or mixing and cooling section of the extruder. A volatile organic compound, e.g. petroleum ether, dichlorodifluoromethane, n-pentane, hexane, heptane or the like, in which the polystyrene is substantially insoluble or only swellable is fed to the barrel of the extruder under pressure via inlet 5 and into admixture with the heat-plastified polystyrene. The resulting mixture is blended and forwarded by flights of the screw and terminal mixing torpedo 6 in the mixing and cooling section of the extruder and is brought to a uniform temperature between 90° and 130° C. as it is forced through the screen or strainer 7 into head 8 and is discharged through one or more outlets or orifices 13 into a greater than atmospheric pressure maintained in pressure-resistant receiving vessel 11. The material under pressure in the extruder is usually discharged into a zone of substantially lower, but greater than atmospheric pressure, preferably a gaseous atmosphere of 50 pounds or more above atmospheric pressure, and above a body of a liquid cooling medium such as water or brine. The extruded material suitably in the form of strands, ribbon or sheet is almost immediately contacted or immersed in the cooling liquid and is rapidly brought to a temperature below the solidus point, i.e. a temperature at which it becomes rigid and is allowed to collect in the receiving vessel. The solid product is removed from the receiving vessel and is cut or broken to a granular form.

While the principle of the invention has been described more particularly with reference to polystyrene, any thermoplastic alkenyl aromatic resin consisting of a predominant amount of one or more alkenyl aromatic compounds chemically combined in the polymer molecule can be employed in the process. Examples of suitable thermoplastic polymers are the normally solid polymers of one or more monovinyl aromatic compounds such as styrene, vinyltoluene, vinylxylene, ethylvinylbenzene, isopropyl styrene, chlorostyrene, dichlorostyrene, fluorostyrene, or copolymers of styrene with from 1 to 30 percent by weight of alpha-methyl styrene or acrylonitrile.

The volatile organic compound to be employed in the process can be a liquid or a gas at ordinary temperatures and pressures, i.e. at atmospheric conditions. The volatile organic compound should be a non-solvent or a poor solvent for the polymer and have a boiling point not substantially higher than the softening point of the polymer, i.e. it should have a boiling point of 95° C. or below at atmospheric pressure. The volatile organic compound should have a molecular weight of at least 58 or greater and a molecular size such that it does not readily diffuse from the solid polymer. Examples of suitable volatile organic compounds are saturated aliphatic hydrocarbons such as butane, isobutane, n-pentane, isopentane, neopentane, hexane, heptane, petroleum ether or saturated aliphatic or cyclic perchlorofluorocarbons. Suitable perchlorofluorocarbons are, trichlorofluoromethane, dichlorodifluoromethane, monochlorotrifluoromethane, sym-tetrachlorodifluoroethane, 1,1,2-trichloro-1,2,2-trifluoroethane sym-dichlorotetrafluoroethane, 1-chloro-1,1,2,2,2-pentafluoroethane, 1-chloro-1,2,2,3,3,4,4-heptafluorocyclobutane or 1,2-dichloro-1,2,3,3,4,4-hexafluorocyclobutane. Mixtures of any two or more of such volatile organic compounds can also be used.

The volatile organic compound is usually employed in amount corresponding to from 0.05 to 0.3 gram molecular weight of said compound per 100 grams of the thermoplastic polymer. The proportion of the volatile organic compound is preferably calculated on a gram molar basis per 100 grams of the polymer starting material in order to have present in the final composition an amount of the volatile compound sufficient to provide an equal or substantially equal volume of vapors for subsequently expanding the polymer to form a cellular body, regardless of the density of the volatile organic compound employed.

In practice of the invention the normally solid thermoplastic polymer, e.g. polystyrene, polyvinyltoluene of a copolymer of from 70 to 99 percent by weight of styrene or vinyltoluene and from 1 to 30 percent of alpha-methyl styrene or acrylonitrile, is fed to the extruder and is pressed and heated in the first section thereof at temperatures between 160° and 280° C. The heat-plastified polymer is forced by means of the feed screw around or through holes in the sealing plate into the second section of the extruder. The flow of the heat-plastified polymer through or around the sealing plate forms an effective seal against counter-current leakage of gas or vapors of the volatile organic liquid from the extruder. The heat-plastified polymer is mixed with a volatile organic liquid, e.g. n-pentane or dichlorodifluoromethane, fed to the second section of the extruder via a suitable inlet in the desired proportion. The resulting mixture is malaxated under pressure and is cooled to a temperature at which it remains flowable, suitably a temperature between 90° and 130° C., preferably a temperature between 90° and 110° C., just prior to extruding the material through a suitable orifice or outlet into a zone of lower, but greater than atmospheric pressure. The composition can be discharged from the extruder into a zone at any pressure lower than that within the extruder and greater than atmospheric pressure, but is usually discharged into a gaseous atmosphere at pressures between 50 and 800, preferably from 100 to 600, pounds per square inch gauge pressure. The composition is usually discharged from the extruder through a die or orifice positioned adjacent to, suitably above, a liquid body of coolant, preferably water at temperatures between 0° and 50° C. The extruded material is contacted, suitably by immersing or spraying almost immediately with the coolant liquid so as to rapidly cool at least the surfaces of the extruded material to a rigid condition. Rapid cooling of the extruded material or surfaces of the extruded material prevents foaming or expansion of the polymer and results in a rigid product having a density between 0.8 and 1.2 and consisting essentially of the solid polymer having the volatile organic compound uniformly dispersed throughout. For these reasons the composition is preferably extruded in the form of strands, ribbons or thin sheet which can rapidly be cooled and readily broken or cut to a granular form. In an alternate procedure the extruded material can be cut into globules or segments as it is extruded and the pieces allowed to fall freely into the coolant liquid. Alternatively the coolant liquid can be sprayed onto the extruded material to rapidly cool the same.

Small amounts of plasticizers, lubricants, dyes, pigments, stabilizing agents and the like can be incorporated with the polymer, but are not required in the invention.

Other additives such as finely divided inert materials, e.g. calcium silicate, or foam retarders such as barium stearate, calcium stearate, lead stearate or zinc stearate, can be advantageously incorporated with the polymeric compositions suitably in amount between 0.02 and 1 percent by weight of the polymer.

The following examples illustrate ways in which the principle of the invention has been applied, but are not to be construed as limiting its scope.

Example 1

Granular polystyrene having a viscosity characteristic of 25 centipoises as determined for a 10 weight percent solution of the polystyrene in toluene at 25° C., together with 0.02 percent by weight of finely divided calcium silicate and 0.04 percent of barium stearate, was fed to a plastics extruder at a rate of 31 pounds of the materials per hour. The plastics extruder employed in the experiment comprised a four foot long jacketed barrel having a 2½-inch diameter screw, two feet long. The screw was equipped with a mixing head 4 inches in diameter by 2 feet long and similar in design to that described in U.S. Patent No. 2,453,088. A sealing plate was positioned on the screw. The extruder had an inlet to the barrel adjacent to the sealing plate on the screw for feed of a volatile organic compound as blowing agent into the extruder. The sealing plate formed a constricted passageway between a first heating or melting section of the extruder and a second mixing section of the same so that flow of the heat-plastified polystyrene through the constricted passageway between the rim of the sealing plate and the bore of the barrel formed an effective plastic seal against counter-current flow of the volatile organic compound from the mixing section of the extruder. The polystyrene was heat-plastified at a temperature of 180° C. in the first section of the extruder and was forwarded by pressure of the screw around the sealing plate into the second section of the extruder wherein it was mixed with n-pentane fed into the barrel of the extruder under pressure at a rate of 2 pounds per hour. The resulting mixture was blended under a pressure in the second section of the extruder, principally by means of the mixing head, and brought to a uniform temperature of 109° C. throughout its mass at a point just prior to extrusion of the homogeneous gel from the second section of the extruder. The gel was extruded under the pressure of 850 p.s.c. pounds per square inch, gauge pressure, through a multiple outlet die having three ⅛-inch diameter drill holes into a nitrogen atmosphere of 300 pounds per square inch gauge pressure, maintained in a pressure resistant vessel over a body of cold water at temperatures between 5° and 150° C., and at a distance of about 2 inches above the surface of the water. The extruded material was almost immediately immersed in the cold water wherein it was rapidly cooled to the solidus point. After collecting a substantial quantity of the solid composition the product was removed from the vessel and ground to a granular form. The product had a specific gravity of 1. A portion of the product was placed in an air oven and heated at a temperature of 130° C. for a period of 65 seconds. The product foamed to a cellular mass having a volume 16 times as great as the initial volume. The cellular product had a density corresponding to 3.9 pounds per cubic foot of the foamed material.

Example 2

In a similar experiment, polystyrene, together with 0.02 percent by weight of finely divided calcium silicate and 0.04 percent of barium stearate, was fed to the plastics extruder described in Example 1 at a rate of 27 pounds per hour and blended with dichlorodifluoromethane, also fed to the plastics extruder at a rate of 3.2 pounds per hour. The resulting mixture was blended under pressure in the plastics extruder and brought to a temperature of 104° C. then extruded into a nitrogen atmosphere of 300 pounds per square inch, gauge pressure, maintained in a pressure resistant vessel over water as described in the preceding example. The extruded material was rapidly cooled by allowing it to fall beneath the surface of the water. After collecting a substantial quantity of the solid composition it was removed from the receiving vessel and ground to a granular form. The product was a dense latent-foaming material consisting essentially of the polystyrene having the calcium silicate, barium stearate and dichlorodifluoromethane uniformly dispersed throughout. A portion of the product was heated at a temperature of 130° C. in an air oven for a period of 65 seconds. It foamed to a cellular mass having a density of 3.2 pounds per cubic foot of the cellular material.

This application is a continuation of our pending application Serial No. 699,667, filed November 29, 1957, now abandoned.

We claim:

1. A process for making a latent-foaming polymeric composition consisting essentially of a normally solid thermoplastic polymer having a volatile organic compound boiling at a temperature not higher than 95° C., and in which the polymer is insoluble uniformly dispersed throughout, which process comprises supplying under superatmospheric pressure at temperatures between 160° and 280° C., a mixture of said heat-plastified normally solid polymer and said volatile organic compound in proportions corresponding to from 0.05 to 0.3 gram molecular proportion of the volatile organic compound per 100 grams of the polymer, advancing the mixture toward an extrusion orifice, malaxating and cooling the mixture during said advancing to a uniform temperature between about 90° C., and a temperature below the heat-plastifying temperature, extruding the material into a zone of lower pressure at least 50 pounds greater than atmospheric pressure and almost immediately contacting the extruded material with an inert liquid cooling medium and cooling the extruded material to a non-foamed rigid condition.

2. A process according to claim 1, wherein the thermoplastic polymer contains in chemically combined form a predominant amount of styrene.

3. A process for making a latent-foaming polymeric composition consisting essentially of a normally solid thermoplastic vinyl aromatic polymer having a volatile organic compound in which the polymer is insoluble uniformly dispersed throughout, which process comprises supplying under superatmospheric pressure at temperatures between 160° and 280° C., a mixture of (1) a heat-plastified normally solid thermoplastic vinyl aromatic polymer containing in chemically combined form a predominant amount of at least one monovinyl aromatic compound of the benzene series and (2) a volatile organic compound of the class consisting of saturated aliphatic hydrocarbons containing from 4 to 7 carbon atoms in the molecule and perchlorofluorocarbons having a boiling point not higher than 95° C. and a molecular weight of at least 58, said mixture containing the volatile organic compound in proportions corresponding to from 0.05 to 0.3 gram molecular proportion of the volatile organic compound per 100 grams of the vinyl aromatic polymer, advancing the mixture toward an extrusion orifice, malaxating and cooling the mixture during said advancing to a homogeneously heat-plastified mass having a uniform temperature between 90° and 130° C. extruding the material into a zone of lower pressure at least 50 pounds greater than atmospheric pressure and almost immediately contacting the extruded material with an inert liquid cooling medium and cooling the extruded material to a non-foamed rigid condition.

4. A process as claimed in claim 3, wherein the thermoplastic polymer is one selected from the group consisting of thermoplastic polymers of at least one monovinyl aromatic compound of the benzene series and thermoplastic copolymers of from 70 to 99 percent by weight of at least one monovinyl aromatic compound of the benzene series and from 30 to 1 percent of a monomer selected from the group consisting of alphamethyl styrene and acrylonitrile.

5. A process as claimed in claim 3, wherein the volatile organic compound is a saturated aliphatic hydrocarbon containing from 4 to 7 carbon atoms in the molecule.

6. A process as claimed in claim 3, wherein the volatile organic compound is a perchlorofluorocarbon.

7. A process as claimed in claim 3, wherein the thermoplastic polymer is polystyrene.

8. A process as claimed in claim 7, wherein the volatile organic compound is n-pentane.

9. A process as claimed in claim 7, wherein the volatile organic compound is dichlorodifluoromethane.

10. A process for making a latent-foaming thermoplastic polymer composition which comprises feeding a heat-plastified normally solid thermoplastic polymer containing in chemically combined form a predominant amount of at least one monovinyl aromatic compound of the benzene series at a temperature between 160° and 280° C. and a volatile organic compound in which the polymer is insoluble into admixture with one another under pressure in a mixing and cooling zone in amounts corresponding to from 0.05 to 0.3 gram molecular proportion of the volatile organic compound per 100 grams of the polymer, said volatile organic compound being selected from the group consisting of saturated aliphatic hydrocarbons containing from 4 to 7 carbon atoms in the molecule and perchlorofluorocarbons having a molecular weight of at least 58 and boiling at a temperature below 95° C., malaxating the resulting mixture under pressure while cooling the composition to a temperature between 90° and 130° C., continuously extruding the composition into a zone of lower pressure at least 50 pounds greater than atmospheric pressure and almost immediately contacting the extruded material with an inert liquid coolant which rapidly cools the extruded material to a non-foamed rigid condition.

11. A process for making a latent-foaming polymeric composition consisting essentially of a normally solid thermoplastic vinyl aromatic polymer having a volatile organic compound in which the polymer is insoluble uniformly dispersed throughout, which process comprises supplying under superatmospheric pressure at temperatures between 160° and 280° C., a mixture of (1) a heat-plastified normally solid thermoplastic vinyl aromatic polymer containing in chemically combined form a predominant amount of at least one monovinyl aromatic compound of the benzene series and (2) a volatile organic compound of the class consisting of saturated aliphatic hydrocarbons containing from 4 to 7 carbon atoms in the molecule and perchlorofluorocarbons having a boiling point not higher than 95° C. and a molecular weight of at least 58, said mixture containing the volatile organic compound in proportions corresponding to from 0.05 to 0.3 gram molecular proportion of the volatile organic compound per 100 grams of the vinyl aromatic polymer, advancing the mixture toward an extrusion orifice, malaxating and coling the mixture during said advancing to a uniform temperature between about 90° C. and a temperature below the heat-plastifying temperature, extruding the material into a zone of lower pressure at least 50 pounds greater than atmospheric pressure and almost immediately contacting the extruded material with an inert liquid cooling medium and cooling the extruded material to a non-foamed rigid condition.

References Cited in the file of this patent

UNITED STATES PATENTS

| | | |
|---|---|---|
| 2,464,746 | Gering | Mar. 15, 1949 |
| 2,515,250 | McIntire | July 18, 1950 |
| 2,537,977 | Dulmage | Jan. 16, 1951 |